Figure 5:
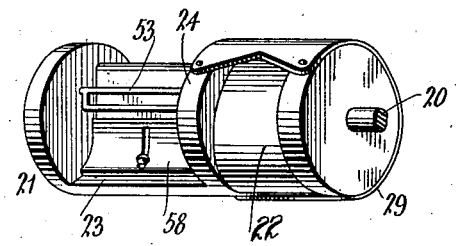

J. B. HARDEN.
COMBINED PLANTER AND FERTILIZER DISTRIBUTER.
APPLICATION FILED OCT. 24, 1907.
1,033,168.
Patented July 23, 1912.
2 SHEETS—SHEET 1.
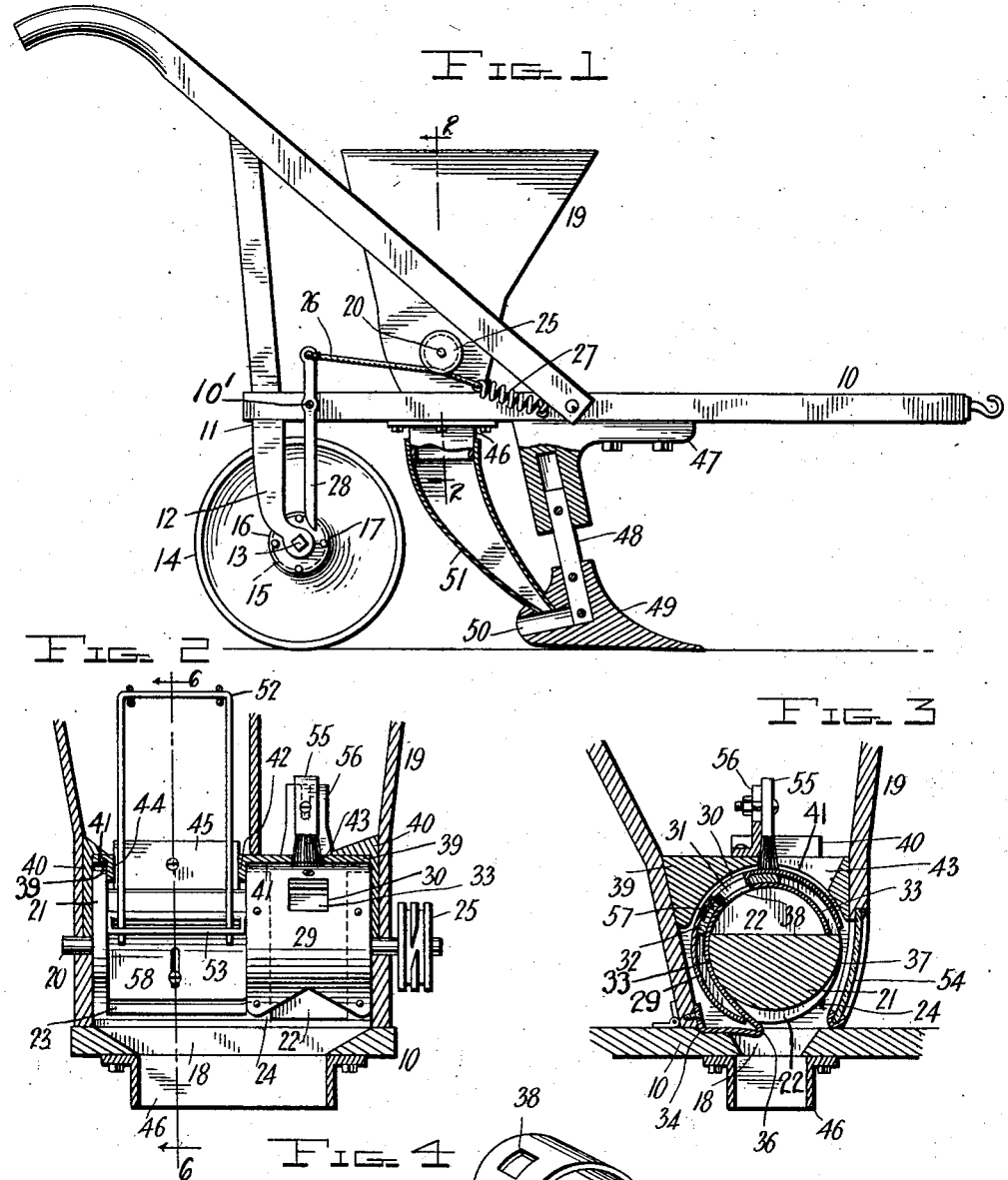
Witnesses
Inventor
Joseph B. Harden
By Chandler & Chandler
Attorneys J. B. HARDEN.
COMBINED PLANTER AND FERTILIZER DISTRIBUTER.
APPLICATION FILED OCT. 24, 1907.

1,033,168.

Patented July 23, 1912.

2 SHEETS—SHEET 2.

Witnesses

Inventor
Joseph B. Harden
By
Attorneys

UNITED STATES PATENT OFFICE.

JOSEPH B. HARDEN, OF WHITE DAY, WEST VIRGINIA.

COMBINED PLANTER AND FERTILIZER-DISTRIBUTER.

1,033,168.  Specification of Letters Patent.  Patented July 23, 1912.

Application filed October 24, 1907. Serial No. 399,000.

*To all whom it may concern:*

Be it known that I, JOSEPH B. HARDEN, a citizen of the United States, residing at White Day, in the county of Monongalia, State of West Virginia, have invented certain new and useful Improvements in Combined Planters and Fertilizer-Distributers; and I do hereby declare the following to be a full, clear, and exact description of the invention, such as will enable others skilled in the art to which it appertains to make and use the same.

This invention relates to improvements in combined planters and fertilizer distributers and has for its object the provision of a machine of that class adapted to positively drop a fixed quantity of corn at definite intervals, and at the same time, to distribute a fixed quantity of fertilizer over the planted corn.

The invention further resides in the provision of a hopper, one section of which is formed of glass, whereby the action of the dropper cylinder may be observed so that the feed therefrom may be regulated when necessary or desired.

The invention still further resides in the provision of means for imparting to the dropper cylinder a partial rotation or oscillation at regularly recurring intervals and for returning the same to its normal position after each of such movements.

The invention further consists in the particular construction, combination, and arrangement of the several parts, all as hereinafter fully described, specifically claimed, and illustrated in the accompanying drawings, in which like parts are designated by corresponding reference characters in the several views.

Figure 6:
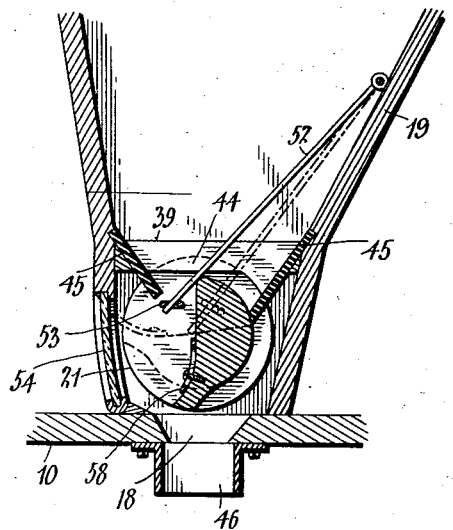

Of the said drawings, Figure 1 is a side elevation of the improved machine, parts thereof being shown in section. Fig. 2 is an enlarged transverse section through the hopper on the line 2—2 of Fig. 1, looking rearwardly and showing the dropping cylinder in one position. Fig. 3 is an enlarged section through the dropping cylinder showing the same in another position. Fig. 4 is a perspective view of the strap or housing. Fig. 5 is a detail perspective view of the dropping cylinder. Fig. 6 is a detail vertical longitudinal sectional view through the fertilizer compartment of the hopper and also through the dropping cylinder on line 6—6 of Fig. 2.

Referring more particularly to the drawings, 10 designates, generally, the main beam or frame of the machine which is provided at its rear end with a bracket 11 secured to the under face thereof, the depending arms 12 of the bracket being perforated for the reception of the ends of an axle 13 upon which is loosely mounted a wheel 14 provided with a concave periphery. The side faces of this wheel are likewise concaved or dished so as to form axially-disposed shoulders 15, one of which carries a plate 16 provided with a series of laterally-projecting pins 17. The beam has formed therethrough toward its rear end and in advance of the bracket 11, a transverse slot 18 directly above which is mounted a feed hopper 19, whose base is hinged to the beam. The side walls of the hopper are provided toward their lower ends with alining perforations which receive the ends of the axle or shaft 20 to which the dropper-cylinder 21 is secured. This cylinder 21 is made with a flange at each end and an intermediate flange 24 concentric with its axis, the spaces between said flanges being concentric thereto. In one of these spaces a corn-receiving pocket 22 is formed, and in the other, a fertilizer pocket 23, the flange 24 between the pockets forming a partition or wall between them. One end of the axle or shaft of the cylinder extends some distance beyond the corresponding side wall of the hopper and carries at such point a pulley 25 in whose periphery a pair of grooves is formed, a chain or cord 26 being passed twice around said pulley and connected at one end to a retractile coil spring 27 and at the other to the upper end of a lever 28 pivoted centrally to the beam by a pivot pin 10' 10, the beveled lower end of the lever extending into the path of movement of the pins 17 carried by the plate 16. By reason of this construction, it will be apparent that the lever will be rocked upon its pivot as each pin successively contacts therewith, the upper end of the lever moving toward the rear end of the beam and thus effecting a partial rotation or oscillation of the dropper-cylinder, which latter is returned to its normal position by the action of the spring 27 as soon as the pin passes beyond the lower end of the lever.

The corn pocket 22 of the cylinder is partially closed by a cover plate 29 which is secured at its opposite side edges to the partition 24 and the adjacent flange or cylinder end, the rear end of said cover plate being notched to provide an outlet for the corn in the pocket. The plate 29 is provided with an opening 30 which registers with an opening 31 formed in a strip 32 of leather or similar material secured to the inner face of the cover plate through which the corn is introduced into the corn pocket. The degree of eccentricity of that portion of the cylinder 21 containing the corn pocket is such that the space formed between the cover plate 29 and said eccentric surface is sufficient to admit the semi-circular upper end portion 33 of a housing 34 which when in place, lies in contact with said eccentric surface and covers the corn pocket when corn from the hopper is filling the cup formed by the openings 30 and 31. The other end of the housing 34 is given a sharp bend as indicated by the numeral 36, this bent portion projecting partly across the slot 18 in the beam 10 and resting on said beam. The end of said bent portion is directed upward and is secured to the front wall of the hopper. An opening 38 is formed through the semi-circular portion of the housing so as to register with the openings 30 and 31 in the cover plate 29 and the bushing 32, respectively, when the cylinder reaches the limit of its initial partial rotation or oscillation under the action of the lever and chain, for admitting corn from the cup, which latter consists of the openings 30 and 31 as stated, into the corn pocket in the cylinder. The bushing 32 bears on the outer surface of the semi-circular portion of the housing and prevents the corn in the cup from dropping outside of the pocket, it also serving as a wear plate and guide for the cover plate 29.

Located within the hopper directly above the cylinder and forming a bottom for said hopper is a horizontal plate 39 which is supported at its side edges upon slides 40 fitted in vertical recesses in the side walls of the hopper, the under face of said plate having a pair of concave seats 41 formed therein into which the upper portion of the cylinder extends, the seats being separated by a downwardly-projecting partition 42, (Fig. 2), which lies against the fertilizer side of the partition 24. The plate 39 is further provided with a pair of openings 43 and 44, which extend through the corresponding seats and communicate respectively with the cover plate opening 30 and the fertilizer pocket 23, into which latter the fertilizer is directed by a pair of inclined rubber plates 45 which are secured to the front and rear walls of the hopper and extend through the opening 44, the lower edges of said plates resting upon the cylinder. The beam is further provided upon its under face with a discharge spout 46 and a casting 47 bolted thereto, the former having its mouth disposed directly beneath the slot 18, the length of the mouth being approximately equal to that of the slot. The casting 47 is disposed forwardly of the slot and spout and is provided with a vertical or slightly inclined socket in which is slidably fitted the upper end of the stem 48 of a shoe or furrow opener 49, the stem being held in adjusted position in the casting socket by means of a set screw, the lower end of the stem fitting in a socket formed in the shoe. The shoe is further provided with a discharge passage 50 formed in the rear portion thereof and inclined slightly downward, said passage communicating with a boot 51, whose lower end is received in an opening in the shoe, while its upper end is telescopically connected with the discharge spout. The lower portion of the shoe is beveled at opposite sides, to form a cutting edge.

The disposition of the corn and fertilizer pockets with respect to each other and to the plate 39 is such that in the normal position of the cylinder the opening 30 in the corn pocket cover lies directly beneath the opening 43 in said plate, thus permitting the grain to pass therethrough and rest upon the curved portion of the housing 34. The fertilizer pocket, however, which is disposed slightly to the rear, as well as to one side of the corn pocket, does not register at this time with the plate opening 44 and is therefore unfilled during the period that the cylinder is motionless. When, however, the cylinder is rotated by the action of the lever 28 into filling position, the grain in the cup 30, 31 will be carried along the curved portion 33 of the housing, until it reaches the opening 38, through which it passes into the pocket 22 in the cylinder, whence it is finally discharged through the spout and boot on the return of the cylinder to its normal or discharging position under the action of the spring 27. During the initial movement of the cylinder, the fertilizer pocket is brought beneath the plate opening 44 and is thus filled, the contents of the pocket being discharged upon the return or backward movement of the cylinder. The position of the corn pocket, however, is sufficiently in advance of that of the fertilizer pocket as to permit the discharge from the first mentioned pocket to occur slightly in advance of that from the last mentioned pocket. The initial movement of the cylinder into filling position is limited by that portion of its eccentric surface which is in line with the end flanges striking the free edge of the curved portion of the housing, (see Fig. 3), and in like manner its return or discharge movement is terminated by the above mentioned portion thereof striking the housing adjacent the bend 36.

The fertilizer compartment of the hopper has disposed therewithin an inverted U- shaped agitator 52 which is pivoted at its upper end portion to the rear wall of the hopper, the free ends of the arms of the agitator extending through the plate opening 44 into the fertilizer pocket of the cylinder where they are retained in place by a U-shaped wire 53 which is disposed transversely of the pocket toward its forward end. Rotation or oscillation of the cylinder will therefore carry the agitator backward and forward through said compartment, thus effecting, to a certain extent a crushing of the fertilizer and, at the same time, preventing it from becoming densely packed therein.

In order to permit the discharge from the cylinder to be observed, the rear wall of the hopper includes a curved section 54 of glass or other transparent material which extends partially around the cylinder, as shown in Fig. 3, such section forming a continuation of the rear wall proper which terminates short of the beam 10. The surface of the cover plate for the corn pocket is kept clean and the corn settling thereon is swept into the feed openings by a brush 55 which is secured to a shoulder 56, fastened on the plate 39 and extends through the opening 43 therein.

In order to effect a regulation of the quantity of corn fed into the corn pocket, the cover plate 29 carries a slide 57 adapted to partially close the opening 31, the fertilizer pocket being likewise provided with a slide 58 held in adjusted position by a set-screw which extends through a slot therein, as shown in Fig. 2. By this means, the quantity of material introduced into the chute from each pocket may be accurately determined by adjusting the position of the slides.

The beam 10 is provided with the usual rearwardly extending handles which are in turn supported centrally by brace rods.

In the operation of the machine, the divided feed hopper will be filled with corn or other seed and fertilizer and the machine started, when the revolution of the wheel 14 and with it the plate 16 will cause the pins 17 carried by the latter to successively engage the lower end of the lever 28 moving the same forwardly. The upper end of said lever will thus be moved in the opposite direction carrying with it the end of the chain 26, such movement of the chain causing a partial rotation or oscillation of the dropper-cylinder until the pin has passed beyond the lower end of the lever, when the spring 27 will then be free to rotate the pulley in the opposite direction, returning the dropper cylinder to its normal or discharge position. On the continued revolution of the wheel 14, the succeeding pin will engage the lower end of the lever, when the above mentioned operations will be repeated. At the termination of the initial rotation of the hopper cylinder through the action of the lever 28, the opening 38 in the housing 34 will register with the feed openings in the cover plate and bushing and thus permit the corn or other seed to fall therethrough into the corn pocket, and upon the return movement of the cylinder to be discharged through the notch in the rear end of the cover plate 29, whence it drops through the slot 18 into the boot 51, it being understood that upon the registration of the fertilizer pocket and spout mouth the fertilizer is likewise discharged through the latter. It is likewise to be understood that the number of perforations in the plate 16 in which the pins 17 fit may be varied at will so that the number of pins and the consequent frequency of discharge of the dropper-cylinder may be varied accordingly, as desired. For example, whereas in the present instance the plate is shown as provided with four pins, eight or any other number of pins may be used in which case the cylinder will be actuated a corresponding number of times during one revolution of the wheel 14. The shoe 49, may, if desired, be adjustably connected with its stem or standard 48 by means of a set screw (not shown) fitting in an opening in the shoe and adapted to impinge against the shoe stem.

From the foregoing, it will be noted that the discharges of fertilizer and corn take place at predetermined intervals and that there is, in consequence, no continued stringing out of the material fed into the furrows.

The invention is not intended to be limited to the exact details of construction shown and described, as it is susceptible to slight modifications and changes within its scope.

What is claimed is:—

1. A machine of the class described comprising, in combination, a frame; an open bottomed feed hopper mounted upon the frame; a dropper cylinder journaled in the lower portion of said hopper, said cylinder having its axle extending beyond one of the side walls of said hopper; a pulley mounted upon said extended axle end; a flexible element in operative engagement with said pulley; means connected with one end of said flexible element for normally holding said cylinder in inoperative position; a movable member connected with the opposite end of said flexible element; and means for actuating said member to effect a partial rotation of said cylinder into operative position.

2. A machine of the class described comprising, in combination, a frame; an open bottomed feed hopper mounted upon the frame; a dropper cylinder journaled in the lower portion of said hopper, said cylinder having its axle extending beyond one of the side walls of said hopper; a pulley mounted upon said extended axle end; a flexible element in operative engagement with said pulley; a spring connected to one end of said flexible element, for normally holding said cylinder in inoperative position; a lever pivoted to said frame and connected with the opposite end of said flexible element; and means for actuating said lever at regular intervals for partially rotating said cylinder against the action of said spring, to move said cylinder into operative position.

3. A machine of the class described comprising, in combination, a frame; a wheel carried by said frame at its rear end; a plate secured to one side of said wheel and provided with a plurality of pins; a feed hopper mounted upon said frame; a dropper cylinder journaled in the lower portion of said hopper and having its axle extending at one end beyond the corresponding side wall of the hopper; a pulley mounted on said extended end; a flexible element in operative engagement with said pulley; a spring connected to one end of said flexible element for normally holding said cylinder in inoperative position; and a lever pivoted intermediate its ends to said frame and connected at its upper end with the opposite end of said chain, the lower end of said lever extending into the path of movement of said pins and adapted to be successively engaged thereby, to partially rotate said cylinder and move the same at regular intervals against the action of said spring into operative position.

4. A machine of the class described comprising a frame; an open bottomed hopper mounted thereon and having a pair of independent compartments; an oscillatory dropper cylinder mounted in said hopper and having a pair of feed pockets; a curved plate partially covering one of said pockets and provided with a feed opening therethrough; a strip of flexible material secured to the inner face of the said plate and having an opening in registration with the opening in said plate; and means for actuating said dropper cylinder, to bring said pockets into registration with said hopper compartments.

5. A machine of the class described comprising a frame; an open bottomed hopper mounted thereon and having a pair of independent compartments; an oscillatory dropper cylinder mounted in said hopper and having a pair of feed pockets; a curved plate partially covering one of said pockets and provided with a feed opening therethrough; a strip of flexible material secured to the inner face of the said plate and having an opening in registration with the opening in said plate; a strip secured to said frame and extending into the path of movement of said dropper cylinder; said strip having an opening therein; and means for oscillating said dropper cylinder, to bring the openings in said plate and strip into and out of registration with said strip opening at predetermined intervals.

In testimony whereof, I affix my signature, in presence of two witnesses.

JOSEPH B. HARDEN.

Witnesses:
JOHN M. HOLLAND,
R. N. LYTTON.